United States Patent [19]

Tramezzani

[11] 4,243,629
[45] Jan. 6, 1981

[54] METHOD AND APPARATUS FOR THE CONTINUOUS EXTRUSION AND BLOWING OF THIN FILMS OF PLASTIC MATERIAL IN PARTICULAR RIGID PVC

[75] Inventor: Gicancarlo Tramezzani, Ponte Tresa, Switzerland

[73] Assignee: P.W.T. Plastic World Technology Limited, Triesen, Liechtenstein

[21] Appl. No.: 20,019

[22] Filed: Mar. 13, 1979

[30] Foreign Application Priority Data

Mar. 29, 1978 [CH] Switzerland ........................ 3323/78
Jan. 19, 1979 [CH] Switzerland ........................ 531/79

[51] Int. Cl.³ .............................................. B29D 23/04
[52] U.S. Cl. ................................ 264/563; 264/176 R; 264/349; 425/207; 425/326.1; 425/376 A
[58] Field of Search ................... 264/563, 176 R, 349; 425/207–209, 376 A, 376 R, 326.1

[56] References Cited

U.S. PATENT DOCUMENTS

| | | | |
|---|---|---|---|
| 3,171,160 | 3/1965 | Moyer | 425/207 |
| 3,212,133 | 10/1965 | Heidrich | 425/376 R |
| 3,467,743 | 9/1969 | Otani | 425/376 R |
| 3,489,830 | 1/1970 | Grigull | 264/102 |
| 4,074,362 | 2/1978 | Kruder et al. | 425/208 |

*Primary Examiner*—Jeffrey R. Thurlow
*Attorney, Agent, or Firm*—Young & Thompson

[57] ABSTRACT

The heating of the powder of rigid polyvinyl chloride in an extrusion machine of known type presents difficulties and causes burning. According to the invention this is avoided by introducing continuously the raw material in the form of powder after intense mixing with stabilizer and plasticizer in the feed opening of a monoscrew extruder. The said monoscrew extruder has eight different zones: an introduction zone preferably without heating; a slightly heated compression zone; a heated homogenization zone (H); a plasticizing zone; a heated decompression zone (D); a heated degasifying zone (G); a heated compression zone ($K_2$) and a heated expulsion zone.

For the plasticizing there is inserted in the extrusion screw before the decompression zone (D) a ring (3) provided with calibrated bores (4 and 5) which obstruct, that is, delay the flow so as to plasticize it without having to increase the temperature.

3 Claims, 13 Drawing Figures

METHOD AND APPARATUS FOR THE CONTINUOUS EXTRUSION AND BLOWING OF THIN FILMS OF PLASTIC MATERIAL IN PARTICULAR RIGID PVC

The present invention relates to a method and an apparatus for the continuous extrusion and blowing of thin films of plastic material, in particular of films of rigid polyvinyl chloride (PVC) having a thickness from $10\mu$ to $60\mu$, introducing continuously the raw material in the form of powder after an intensive mixing with stabilizers and plasticizers in the inlet opening of a monoscrew extruder.

The production of rigid PVC films is at present in continuous development. The goal to be achieved is the increase in the flow through extruders operating in a continuous manner and the reliability of the manufacture guaranteeing a high level of quality with reduction of cost.

PVC (polyvinyl chloride) is very sensitive thermally above 100° C. Beyond this temperature it is damaged to an increasing extent by the separation of hydrochloric acid. However, it is desirable to work at granulation temperatures of the mass of about 175°–190° C. occur and extrusion temperatures of about 185°–220° C. Granulation and extrusion are possible only by adding to the mass stabilizers and plasticizers which are partially consumed during heating.

The said stabilizers and plasticizers may influence negatively the quality of the product. With the elimination of the granulation, that is, using the powders according to the present invention the PVC undergoes only once a high thermal stress and that is during the single extrusion. For that reason discolorations, reticulations and other defects can be diminished or obviated by having recourse to powders.

The quantity of additives, that is of stabilizers and plasticizers may also be diminished if the granulation is avoided which, besides a better final product, provides also an economic advantage, since these additives are very expensive.

The heating of the rigid PVC powder in the extrusion machine has however difficulties as the range of temperatures permitted is very limited either due to the resistance opposed to the flow of the material to be plasticized or due to the limited thermal stability.

It is possible that local over-heatings may occur in particular in those parts of the extrusion machine having low thermal conductivity which lead to thermal damage of the already prestressed mass.

The working of rigid PVC in extruders is furthermore very limited by the low thermal stability of the mass. To the requirement of a thermal stress as low as possible is opposed that of obtaining products qualitatively unexceptionable by means of high working temperatures and for that reason low resistances to flow. High temperatures of the mass are possible only for short intervals of time so that the mass is not damaged.

The thermal decomposition of the PVC during the manufacture is characterized as indicated by the separation of hydrochloric acid by the self-oxidation and by the reticulation. Low thermal damages which do not influence the method of extrusion may instead cause discolourization as well as, by the diminution of the mechanical qualities, unutilizability of the product. Considerable thermal damages may be noted in the form of streaks which are firstly of a light chestnut colour and then become dark chestnut before completely carbonized pieces arrive on extrusion. Once the centre of damage has arisen a part of the damaged mass remains attached to the surface of the metal of the extruder and causes an extrusion of the so-called "burning" on the whole mass.

Upon the appearance of the above mentioned streaks it is generally necessary to interrupt the production. After dismantling the drawplate and the screw all the parts which come into contact with the mass must be carefully cleaned. After the renewal of the extruder it requires hours, according to the size of the machine, to arrive at the state of normal production so that the said work of assembly and cleaning means a considerable loss of time and therefore of production.

The method and the apparatus according to the present invention permit of overcoming the difficulties referred to, rendering possible the optimum working of the rigid PVC powder with monoscrew extruders and the production of treated films and with thin walls of uniform thickness, films which are thermoweldable, perfectly printable and have good resistance to printing inks.

The advantages of the method in question consist in the fact that too long a heating of the material and therefore its carbonization are avoided. It is due, not only to the subdivision in a plasticization zone and in a homogenization zone but also in the relatively short forcing of the material into the plastisticization zone.

The temperature in the extruder preferably remains below about 190° C. From the moment, starting from the raw material in powder, that the difficulties of its fluidifying increase substantially, the method in question provides for inserting in the path of the extruder after the material has been duly heated, compressed and homogenized, an obstacle having calibrated openings which force the flow of material transported by the screw of the extruder to slow down, that is, to change speed and consequently to plasticize, but without increasing the temperature after which follows the decompression, the degasifying, the subsequent compression and the expulsion through the extruder.

The apparatus which permits of realizing the method in question has for this purpose coaxially with the extrusion screw after the compression and homogenization zone a breakflow ring with bores which slow the efflux of the material forcing it to plasticize after which follows the decompression, degasifying, subsequent compression zone and expansion through the extruder.

The invention will now be better explained in the following in connection with two embodiments of the apparatus, that is, the extruder which permits of realizing the method in question.

The drawings show:

in FIG. 1 an extruder according to a first embodiment of the invention in very diagrammatic form in longitudinal section;

in FIG. 2 a section along the line II—II of FIG. 1 on an enlarged scale;

in FIG. 3 the longitudinal section of the central zone of the extruder according to FIG. 1 on an enlarged scale corresponding to the degasifying zone adjacent to this;

in FIG. 4 the section along the line IV—IV of FIG. 3 through the degasifying pump on an enlarged scale;

in FIG. 5 the partial section V—V of FIG. 4 through the piston of the degasifying pump on an enlarged scale;

in FIG. 6 the diagram of the path of the shaft of the degasifying pump as a function of the time;

Figure 10:
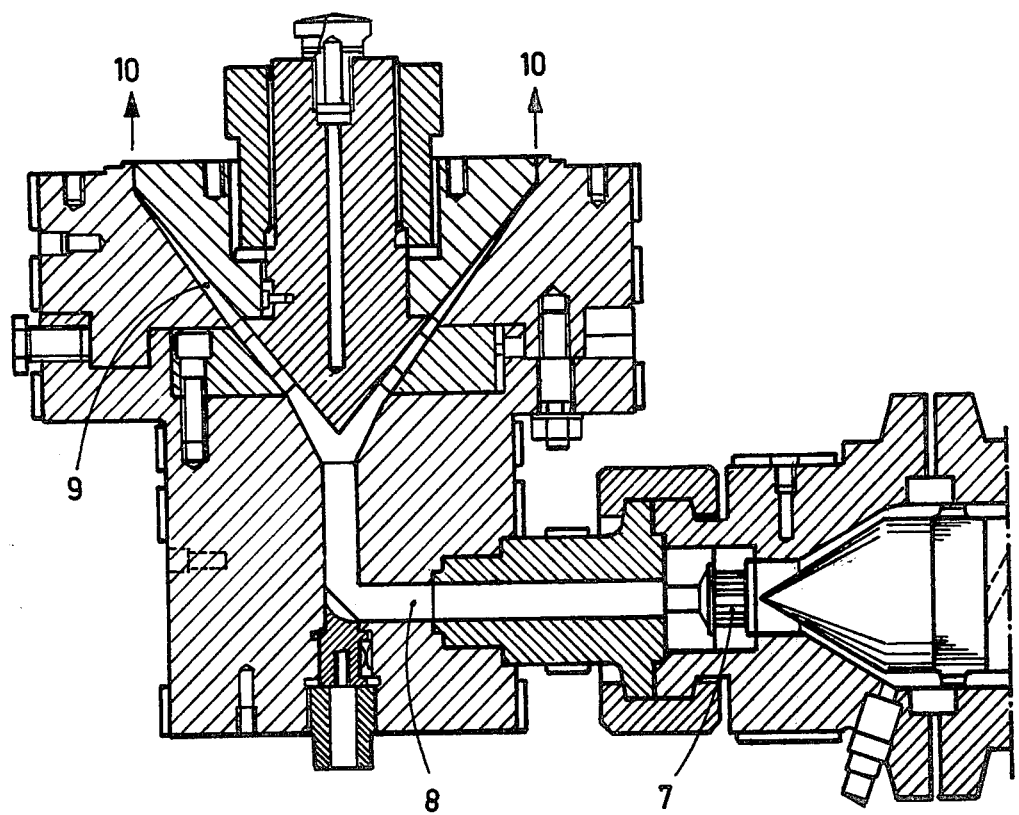

FIG. 10 the extrusion head in axial section.

Figure 1:
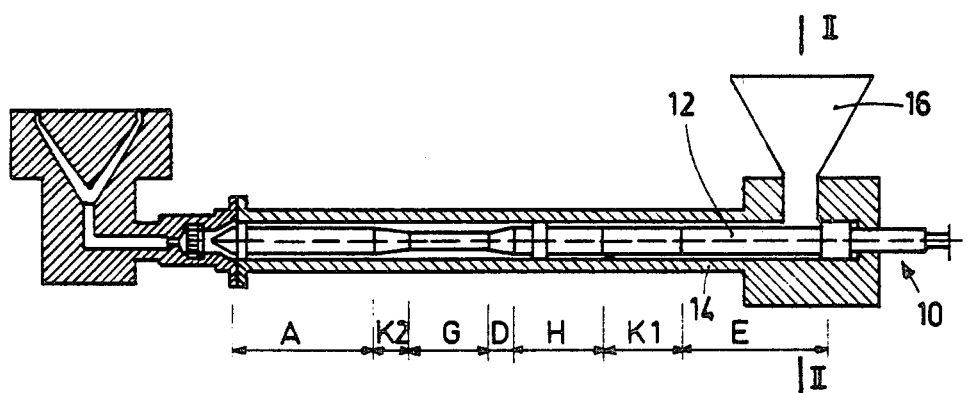
Figure 2:
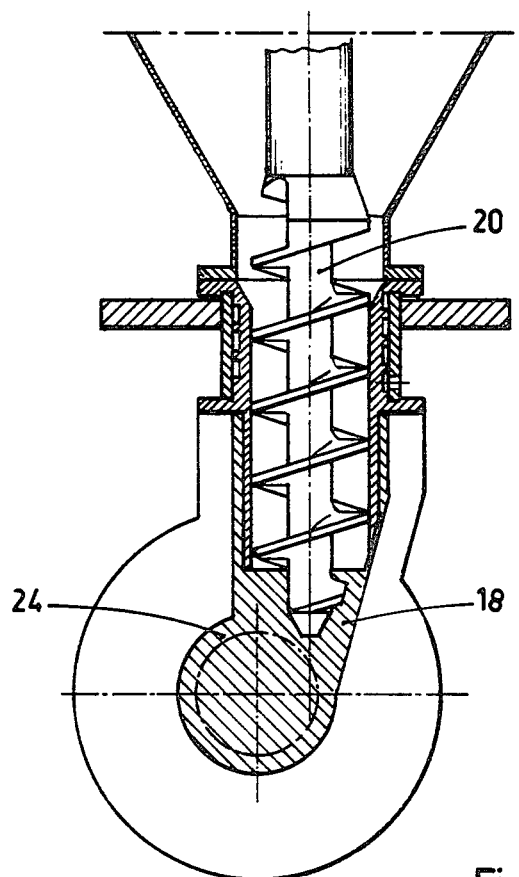

The extruder indicated in general in FIG. 1 with the reference number 10 shows the extrusion screw 12 lodged in the cylinder of the extruder 14. From a feed hoopper 16 the work material, that is, the resin in powder form mixed with stabilizers and plasticizers is fed through the feed screw 20 (FIG. 2) arranged in the channel 18 to the extrusion screw 12 illustrated in FIG. 1 passing through the inlet opening 24 (FIG. 2).

Figure 3:
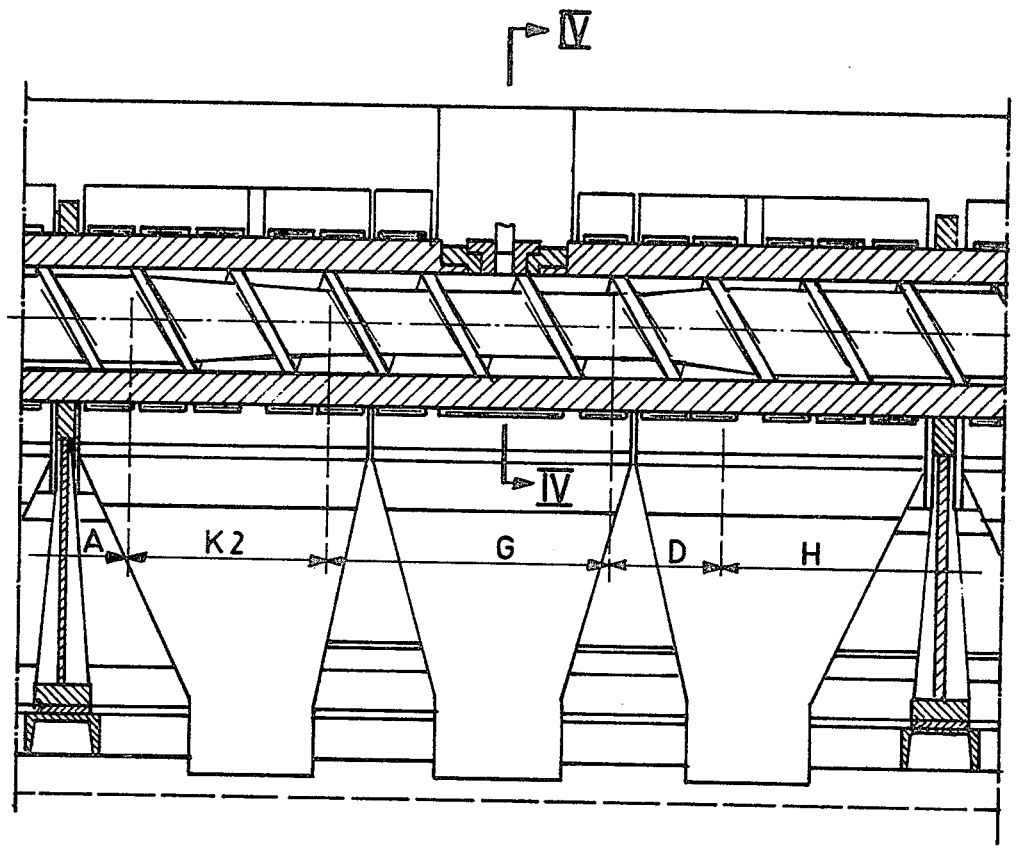
Figures 4, 5:
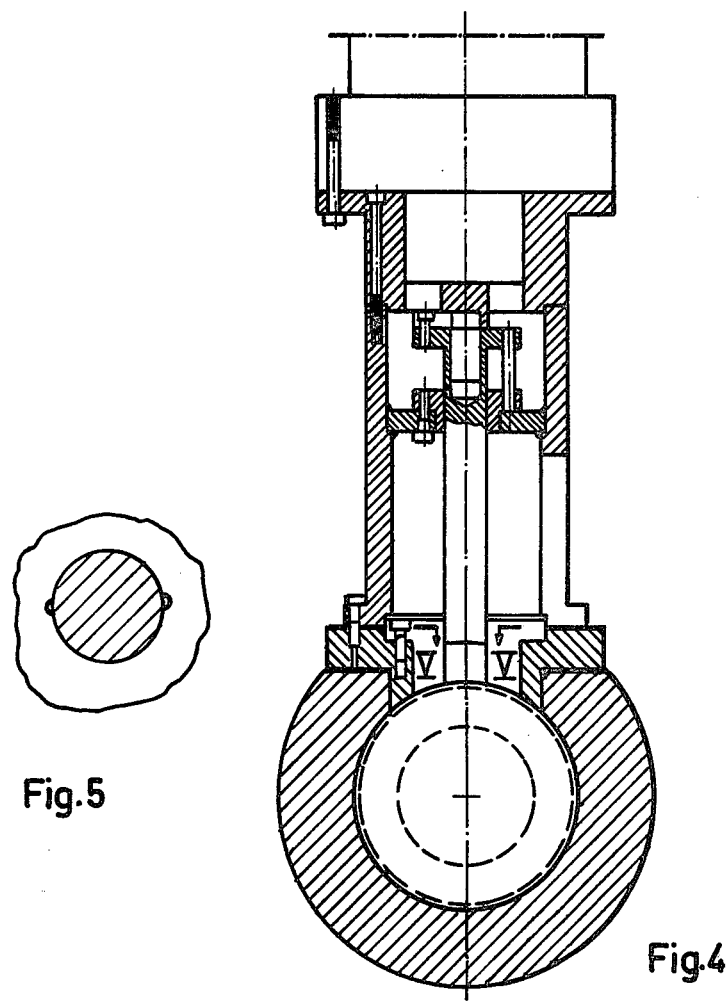

The extrusion screw 12 has seven different zones (see FIGS. 1 and 3).

In the area of the feed hopper 16 of the material is provided the introduction zone E. In this zone the extrusion screw 12 has almost constant outer diameter, inner diameter and pitch and is preferably unheated. A first compression zone $K_1$ slightly heated follows the introduction zone E in which the screw has a constant outer diameter, an increasing inner diameter (conical shank) and constant pitch. A heated homogenization zone H follows the first compression zone $K_1$ in which the screw has a constant outer diameter and inner diameter and pitch. A heated decompression zone D follows, in which the screw has a constant outer diameter a greatly decreasing inner diameter and a constant pitch; next comes a heated degasification zone (G) in which the screw has a constant inner diameter but reduced in respect of the aforesaid diameters and a constant pitch.

A second heated compression zone $K_2$ in which the screw has a constant outer diameter, an increasing inner diameter (conical shank) and constant pitch follows the degasification zone G. A heated expulsion zone A in which the screw has a constant outer diameter but limited over a certain length, a constant inner diameter for the same length and tapered at the end in the proximity of the extrusion head the mass from which perfectly plasticized leaves in tubular form and becomes thinned by means of blowing of the tube in radial direction and stretching in axial direction follow the second compression zone $K_2$.

Figure 6:
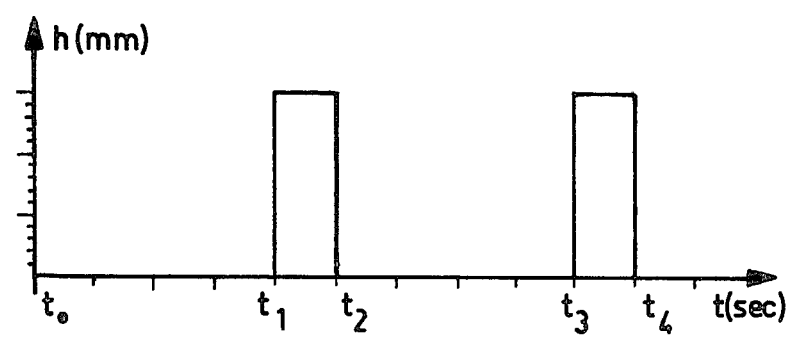
Figure 7A:
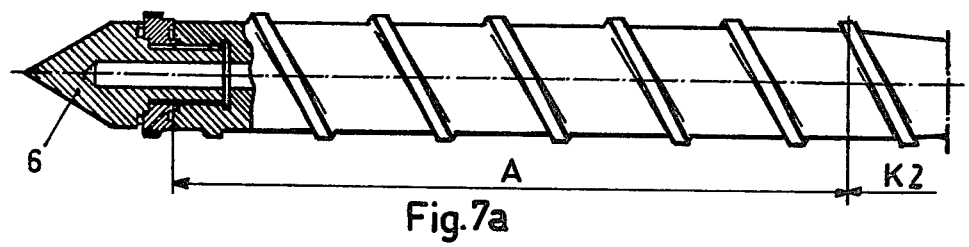
FIGS. 7a, 7b, 7c, 7d show the various sections constituting the single screw of the extruder in a second embodiment of the invention.
Figure 7B:
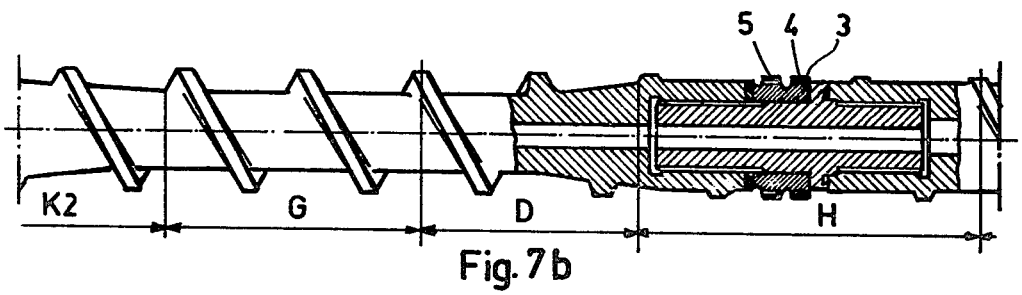
Figure 7C:
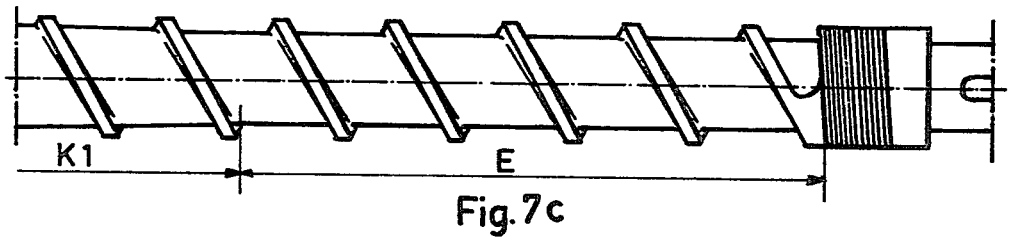
Figure 7D:
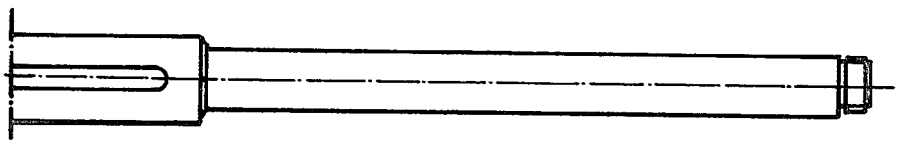

In the diagram of FIG. 6, as already indicated, is shown the path in millimeters of the shaft of the degasifying pump as a function of time in seconds.

As can be seen the piston stroke occurs very rapidly corresponding to the time t, is kept constant in the time between $t_1$ and $t_2$ and returns abruptly to the starting point at the time $t_2$—just as for the times $t_3$ and $t_4$.

In the extrusion screw illustrated in FIGS. 7a, 7b, 7c, 7d, the distance E corresponds to the introduction zone of the powder of polyvinyl chloride mixed with stabilizers and plasticizers. The introduction takes place cold at a very low temperature. The compression zone $K_1$ follows, in which the outer diameter of the screw is constant, but the inner diameter increases, only the pitch being constant so as to determine the compression.

The homogenisation takes place in the following zone H. In this the outer and inner diameters of the screw and the pitch are constant.

Figure 8:
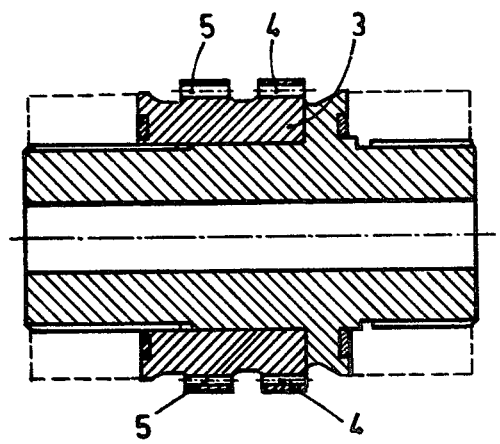
FIG. 8 show the enlarged detail of the break flow ring illustrated on a reduced scale in FIG. 7b.

Towards the end of the homogenisation zone is interposed the break flow ring 3 (see FIG. 8) having the calibrated bores 4 and 5 so as to cause an obstacle to the normal flow of the plastic material along the extrusion screw to force it to become plastic without having to increase the temperature.

This constitutes the essential part of the present invention as it brings about a considerable improvement in the working conditions of the plastic material especially of rigid polyvinyl chloride which is very sensitive to the increases of temperature and is capable of being made plastic with difficulty at relatively low temperature without the intervention of the apparatus now referred to.

The decompression zone D in which the outer diameter and the pitch of the screw are constant whilst the inner diameter decreases rapidly to reduce abruptly the pressure follows the homogenization zone H.

In the following degasifying zone G the outer diameter and inner diameter of the screw are constant and thus also the pitch whilst a suitable pump, not illustrated, provides for removing the gasses.

In the following zone $K_2$ there is a new compression for which the outer diameter and the pitch of the screw are constant whilst the inner diameter increases.

Finally in the expulsion zone A the outer diameter, the inner diameter and the pitch are constant.

Figure 9:
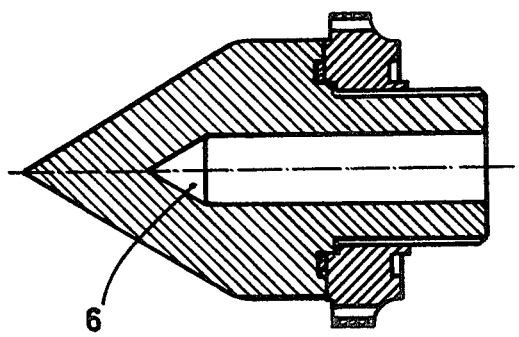
FIG. 9 shows the front end of the extrusion screw.

The screw terminates with the pointed head 6 (FIG. 9) whilst the raw material, perfectly plasticized, passes through the drawplate 7 (FIG. 10), the channel 8, the opening 9 of circular section and leaves at 10 in the form of a tube the thickness of which is gradually diminished by blowing in radial direction and by axial traction.

The drawplate illustrated in FIG. 10 can be classified among those of the so-called type "with radii" and has the advantage of a better distribution of the mass in respect of the known "heart-shaped", "spiral-shape" etc., extrusion drawplates in which the course of the extrusion mass is simpler and the expulsion speed greater.

Wishing to work the polyvinyl chloride with the known extruders, the drawplate with radii is the least subject to the effects of burning and decolouration since the mass is reduced if the expulsion speed from the drawplate is too low.

On the contrary, with the extruder according to the present invention in which there is not any reduction of the mass, the drawplate with radii is really suitable because it permits of optimum distribution of the mass coming out and therefore a perfect thickness of the film.

It is arranged for the breakflow ring 3 (FIG. 8) to be capable of being realized also in a completely different manner provided that there are present openings calibrated to the passage of the flow of plastic material which break the said flow that is obstruct it partly to favour the plasticization without increasing the temperature.

What we claim is:

1. A method for the continuous extrusion and blowing of thin films of plastic material, comprising introducing the raw material into an extruder having a screw, precompressing the material continuously in the cold state in the screw, plasticizing the material by heating, leading the material through a throttling opening along a further portion of the screw, decompressing the material along a subsequent portion of the screw, degassing the material along still another portion of the screw, again increasing the pressure along a still further portion of the screw, and then extruding the material to a thin film.

2. Apparatus for the continuous extrusion of thin films of plastic material, comprising an extrusion screw, means for feeding the raw material to the extrusion screw, the extrusion screw having, along its length, in the extrusion direction, a compression section in which the screw has a constant outer diameter and an increasing inner diameter and constant pitch, a homogenization zone in which the screw has constant inner and outer diameter and pitch, a plasticization zone in which the material is forced through at least one orifice, a decompression zone in which the screw has constant outer diameter and decreasing inner diameter and constant pitch, a degasification zone in which the screw has constant outer diameter and constant inner diameter and constant pitch with the inner diameter reduced in respect of the preceding diameters, a compression zone in which the screw has constant outer diameter and an increasing inner diameter and a constant pitch, and an expulsion zone from which the extruded material is expelled.

3. Apparatus as claimed in claim 2, and at least one break flow ring surrounding the screw, said at least one orifice extending through the break flow ring in the direction of flow of the material.

* * * * *